(12) United States Patent
Petri et al.

(10) Patent No.: US 10,904,376 B1
(45) Date of Patent: Jan. 26, 2021

(54) LOCATION SPECIFIC CONTAINER BASED MANAGEMENT OF MOBILE DEVICES

(71) Applicant: International Business Machines Corporation, Armonk, NY (US)

(72) Inventors: John E. Petri, St. Charles, MN (US); Gregory Paul Andrews, Rochester, MN (US); David Stanich, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/793,507

(22) Filed: Feb. 18, 2020

(51) Int. Cl.
*H04M 1/725* (2006.01)
*G06Q 50/18* (2012.01)
*H04W 4/021* (2018.01)
*G06Q 50/00* (2012.01)

(52) U.S. Cl.
CPC ........ *H04M 1/72572* (2013.01); *G06Q 50/01* (2013.01); *G06Q 50/184* (2013.01); *H04M 1/72577* (2013.01); *H04W 4/021* (2013.01)

(58) Field of Classification Search
CPC ..... G06F 9/45558; G06F 21/53; H04L 67/10; H04L 67/22; H04L 63/101; H04W 4/021; H04W 4/029; H04W 12/00503; H04W 4/023; H04W 4/024; H04W 4/50; H04M 1/72572; H04M 1/72577; G06Q 50/01; G06Q 50/184
See application file for complete search history.

(56) References Cited

U.S. PATENT DOCUMENTS

| 6,944,679 | B2 | 9/2005 | Parupudi et al. |
| 10,015,132 | B1* | 7/2018 | Qin .................... H04L 61/2084 |
| 10,028,139 | B2 | 7/2018 | Iyer et al. |
| 10,110,730 | B1* | 10/2018 | Kingry ............. H04M 1/72577 |
| 2008/0019317 | A1 | 1/2008 | Vellanki et al. |
| 2011/0230211 | A1* | 9/2011 | Kim ........................ G06F 21/71 455/456.4 |
| 2013/0210404 | A1* | 8/2013 | Curtis ..................... H04L 67/34 455/418 |
| 2014/0310772 | A1 | 10/2014 | Marshall et al. |
| 2015/0050922 | A1* | 2/2015 | Ramalingam ..... H04W 12/0027 455/418 |

(Continued)

OTHER PUBLICATIONS

"Managing Devices and Corporate Data on iOS", Apple Incorporated, Jul. 2018, 14 pages.

(Continued)

*Primary Examiner* — Daniel Lai
(74) *Attorney, Agent, or Firm* — Stephen J. Walder, Jr.; Anthony England

(57) ABSTRACT

A container agent executing on the mobile device receives a container from a container manager server in response to the mobile device being within the predetermined proximity of the physical location. The container comprises instructions that modify the original functionality of the mobile device. The container agent monitors operation of the mobile device to determine if the operation satisfies a triggering condition for execution of the container, and if so, executes the container. In response to the mobile device leaving the predetermined proximity of the physical location, the container agent removes the container from the mobile device and restores the original functionality of the mobile device.

20 Claims, 4 Drawing Sheets

(56) References Cited

U.S. PATENT DOCUMENTS

2015/0089673 A1*   3/2015   Beckman ................ G06F 21/10
                                                     726/29
2015/0378709 A1*  12/2015   D'Amico .................. G06F 8/61
                                                     717/176
2019/0171438 A1    6/2019   Franchitti

OTHER PUBLICATIONS

"What is a Container? A standardized unit of software", Docker Inc., accessed online Oct. 29, 2019, 5 pages.
Green, Amy, "Should Bedrooms Be No-Phone Zones for Teens?", Psychology Today, blog/psy-curious, Feb. 17, 2017, 2 pages.
Johnston, Alice, "11 Surprising Places Where You Can't Use Your Phone, Ever", Culture Trip, Apr. 16, 2018, 12 pages.
Roti, Jessi, "Amy Schumer's coming to the Chicago Theatre—and she's taking your cellphone", Chicago Tribune, Oct. 16, 2018.
White, Sarah K., "What is geofencing? Putting location to work", CIO from IDG Communications, Nov. 1, 2017, 9 pages.

* cited by examiner

LOCATION SPECIFIC CONTAINER BASED MANAGEMENT OF MOBILE DEVICES

BACKGROUND

The present application relates generally to an improved data processing apparatus and method and more specifically to mechanisms for providing location specific container based management of mobile devices.

The ubiquity of mobile devices in modern society is unquestionable. However, in some situations, using a mobile device, or even just having a mobile device on one's person, is not always acceptable.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided for modifying an original functionality of a mobile device in response to the mobile device being within a predetermined proximity of a physical location. The method comprises receiving, by a container agent executing on the mobile device, a container from a container manager server, in response to the mobile device being within the predetermined proximity of the physical location. The container comprises processor executable instructions that implement a modification to the original functionality of the mobile device. The method further comprises monitoring, by the container agent, operation of the mobile device to determine if operation of the mobile device satisfies a triggering condition for execution of the container. Moreover, the method comprises, in response to results of the monitoring indicating that the operation of the mobile device satisfies a triggering condition for execution of the container, executing, by the container agent, the container such that the original functionality of the mobile device is modified in accordance with the modification implemented by the container, while the mobile device is present within the predetermined proximity of the physical location. In addition, the method comprises, in response to the mobile device no longer being within the predetermined proximity of the physical location, removing, by the container agent, the container from the mobile device and restoring the original functionality of the mobile device.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1A:
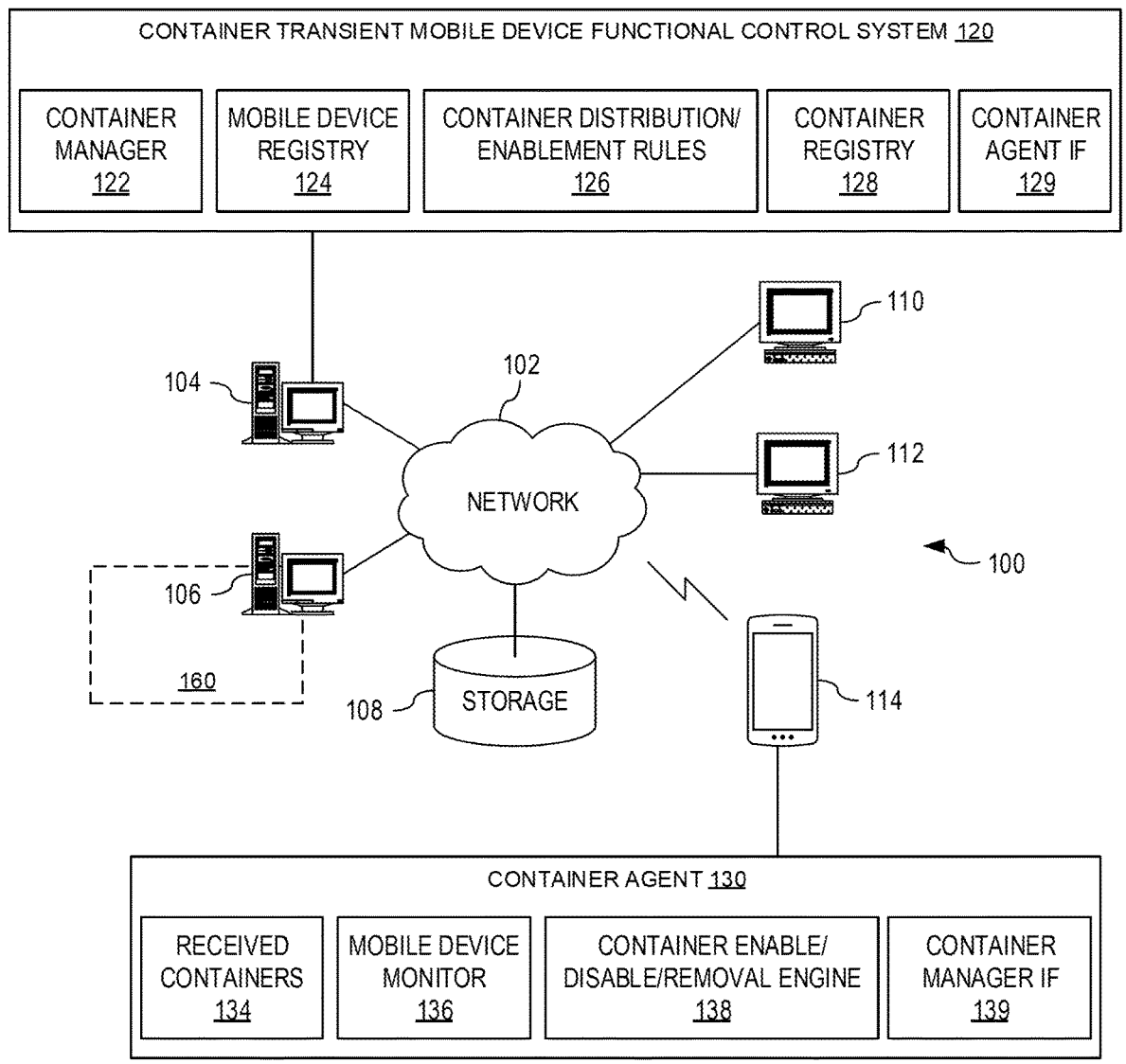
FIG. 1A is an example diagram of a distributed data processing system in which aspects of the illustrative embodiments may be implemented.

Embodiments of the present invention involve recognition that sometimes the acceptable or unacceptable nature of mobile device use is readily apparent, such as using a mobile device in a movie theater while watching a movie, using a mobile device in the middle of a church service, etc. However, there are other situations where the acceptability/inappropriateness of mobile device usage is not so apparent, e.g., at concerts, sporting events, recitals, comedy shows, within certain businesses, certain classroom settings, locker rooms, gymnasiums, etc.

There are some places that strongly discourage or outright ban mobile device usage and/or mobile devices themselves, including famous locations and museums, e.g., the Sistine Chapel. For some entertainment concerts or shows, the entities providing the concert/show may even have spectators place their mobile devices in locked pouches or lockers as a condition of entry to the concert/show. Often, this is to protect the content of the concert/show from being recorded, instant messaged, or the like. In other cases, such restrictions may be used to protect the objects in the location, e.g., in some museums, flash photography and the like may have a deteriorating effect on works of art and antiquities.

There is also a growing concern about children having mobile devices with them everywhere and being able to access content, often times outside the view of parental figures or care takers. While Internet usage on mobile devices by children may be mitigated to some extent, and Internet content restrictions may be enforced in the home with existing technology such as firewalls and routers, it is much more difficult to manage outside the home.

Thus, with the proliferation of mobile devices and their increasing capabilities, the reliance of people on constant access to content has become a problem where such mobile device usage is unacceptable or inappropriate. Furthermore, it is becoming more difficult for intellectual property owners to protect their works from illegal copying, recording, etc. when providing performances, displays, or the like, of their works since it easy for persons with mobile devices to surreptitiously record, capture digital photographs, etc. of the works. In some cases, individuals or organizations may have physical areas where they do not want certain capabilities of mobile devices being used, e.g., government installations needing to control the ability of persons to record audio/video, take photographs, text, etc. Moreover, even at the individual home level, there is a need for parents and other persons with authority over other individuals, e.g., children, elderly, persons with mental disabilities, etc., to be able to enforce controls over such mobile device usage and/or content access, even when the governed individual is outside a physical area of control of the parent or authority figure.

In order to provide some enhanced controls within geographical areas, geofencing mechanisms have been developed. Geofencing refers to technological mechanisms used to create a virtual geographic boundary using sensors and signal transmitting devices that enables software to trigger a responsive action when a mobile device enters or leaves a particular geographical area. For example, geofencing may be used to disable certain features of a mobile phone while the mobile phone is within the particular geographical area. Recently, for drone aircraft, geofencing has been used as a mechanism for preventing the drone aircraft from entering restricted air space, such as around airports and military installations. Such geofencing mechanisms do not permit the user of the mobile device to give assent to the modification of the functionality of the mobile device. That is, the user is not given alternatives to the disabling/enabling of functionality of the mobile device and thus, is not in control of their own device when entering or attempting to enter the geofenced locations.

Other mechanisms for automatically enabling/disabling functionality of mobile devices have been used as well, including mechanisms for showing targeted advertising, pushing specific notifications, and the like, based on the mobile device's location. These additional mechanisms use functionality coded within the mobile device applications themselves or are specifically set by the user, e.g., such as in the case of an alarm or reminder application. In some mechanisms, managed certificates are used to restrict operating system level features, such as camera features, global positioning system (GPS) features, automatic assistants, e.g., Siri™ (available from Apple Inc.) or Alexd™ (available from Amazon.com Inc.), etc. These mechanisms require that the user of the mobile device manage the settings, certificates, and permissions present on the mobile device with regard to these enabling/disabling functionalities. That is, after the user has moved from a location where such enablement/disablement is enforced, it is up to the user to modify the settings, certificates, and permissions to re-enable/remove the disablement of the functionality.

To address these shortcomings, the illustrative embodiments provide a location specific container based management mechanism for mobile devices. The illustrative embodiments provide a solution that manages mobile device capabilities in a transient manner using containers, such as Docker containers, or the like. That is, the mechanisms of the illustrative embodiments, using containers as a basis, provides a management system that controls which containers to distribute to mobile devices, at which times, and under which conditions, to distribute the containers to the mobile devices, and what mobile device activities trigger such distribution and enablement/disablement of containers on the mobile device. The illustrative embodiments further provide a container agent which executes on the mobile devices to initiate/disable the containers and communicate with the container manager. As a result, containers may be distributed, enabled/disabled, and removed from mobile devices as needed based on the location of the mobile device and/or conditions under which the mobile device is being used.

With the mechanisms of the illustrative embodiments, the container manager is provided in a computing system that is specifically configured to implement the container manager and which is in communication with other systems for communicating with the mobile devices, and for determining the location of the mobile devices with regard to protected physical areas. A "protected physical area" in the context of the present description is a physical location, geographical region, building, venue, or any other demarcation of a physical area or region of physical space, where the functionality of mobile devices is to be controlled in a desired manner. The computing system may be remotely located from the protected physical area, or may be present in the protected physical area but separate and distinct from the mobile devices. The presence of the mobile devices entering, leaving, or maintaining their presence within the protected physical area is detected and monitored using any known sensing mechanism, e.g., GPS, wireless transceivers, geofencing mechanisms, Radio Frequency Identification (RFID) devices and sensors, and the like.

The "container," as the term is used herein, is a lightweight, stand-alone, self-contained, executable package of software resources that includes everything needed to run an application present within the container, e.g., the code, runtime, system tools, system libraries, settings, etc. in a manner that is not dependent on the runtime environment of the computing device on which the container is executed. Containers virtualize the operating system of computing systems, whereas virtual machines virtualize the hardware of the computing systems, and thus, a container isolates the application from the runtime environments of the particular computing devices, or mobile devices. This isolates the application from any conflicts between such runtime environments, e.g., conflicts between development/runtime environments. One example container technology that may be utilized with some illustrative embodiments of the present invention is a Docker container.

The container manager operates to register and manage containers for the protected physical area. An owner, operator, or other entity responsible for, or otherwise associated with, the protected physical location may determine which types of functionality of mobile devices they wish to enable/disable, and/or what types of new or additional functions they want to perform with regard to the mobile devices while they are within the protected physical area. These functionalities are associated with applications embodied as registered containers managed by the container manager. The containers themselves may be created by a programmer generating the container, a user using a container development toolkit which may provide a user interface with drag and drop capabilities to define containers and container functionality, or any other known or later developed mechanism for defining containers. There are many existing application development toolkits and tutorials accessible via the Internet that describe how to generate containers, such as Docker containers, for applications and thus, a detailed explanation of how to generate containers will not be provided herein.

The party associated with the protected physical area may also define the conditions for enablement/disablement of the functionalities, which may be as simple as entry into or leaving from the protected physical area, to more complex conditions involving specific actions performed by a user of the mobile device via the mobile device, e.g., taking a picture with the camera, initiating video and/or audio recording, etc. For example, a party associated with the protected physical area may define a triggering condition for distribution and enablement of a container on a mobile device to be that the mobile device is within range of a sensor associated with the protected physical area for a predetermined amount of time. In another example, a party associated with the protected physical area may define a triggering condition for disablement and removal of the container from a mobile device to be that the mobile device is out of range of sensors associated with the protected physical area, i.e. is no longer registering as present within the protected physical area, for a predetermined period of time. Similarly, if GPS location services are used, the triggering conditions may be a tracking of movement of the mobile device to determine not only location but direction of movement to determine if the mobile device is entering or leaving the protected physical area. In other situations, the triggering conditions may be more complex and evaluate a plurality of factors for determining whether to initiate distribution and enablement, or disablement and removal, of containers, e.g., if the user is within the protected physical location for a predetermined period of time and initiates the camera function of the mobile device, for example, this may be a triggering action that causes distribution/enablement of the container.

With regard to the terms "enablement" and "disabling" in the context of mobile device features or the containers themselves, what is meant is that the functionality of a container is either executed, or execution is discontinued, respectively, which results in one or more mobile device features to be initiated or discontinued, or another action performed/performance ceased by the mobile device specifically in response to the enablement/disabling of the container. Moreover, there may be separate triggering conditions, actions, or events for distribution of containers and for enablement/disablement of the already distributed containers. For example, there may be a triggering condition of entry into the protected physical area that causes the container manager to distribute a container to the mobile device along with configuration parameters that configure the container agent to monitor for certain actions being performed with the mobile device, e.g., camera software being initiated. When the container agent determines that the separate trigger condition for which the container agent is monitoring the mobile device occurs, the enablement, or execution, of the container may be initiated.

Before containers may be distributed and executed on mobile devices, the users may be required to indicate their consent to such distribution and execution. For example, as a requirement for entering or otherwise accessing the protected physical area, the users of mobile devices may be required to agree to the distribution of containers to their mobile devices either through a separate agreement with the provider of the event, offering, and/or protected physical area, or an electronic consent mechanism such as an electronic user interface, as may be provided via their mobile device, electronic ticketing system, or the like. Such consent may be given as part of a legal contract or agreement between the user and the provider of the protected physical area and/or parties associated with any event or other offering at the protected physical area. For example, as part of a "ticket" contract, terms may be specified that by purchasing, retaining, and/or using a ticket to obtain access to the event or offering, the user gives permission for the parties associated with the event and/or protected physical area to distribute and execute containers on their mobile devices. Similarly, legal agreements may be entered into based on entry into the protected physical area. In some cases, different physical entry points, or different conditions for entry, may be established for persons agreeing with the distribution and execution of containers on their mobile device, and persons that do not agree. For example, if a person does not agree to the distribution and execution of containers on their mobile device, they may be asked to place their mobile device in a secure locker, security pouch, or the like. Any manner of obtaining consent from the user of the mobile device may be used based on the particular implementation without departing from the spirit and scope of the present invention. For example, in some illustrative embodiments, either when obtaining a ticket to an event, or in response to coming within a predetermined proximity of the physical location, a user interface may be output on the mobile device indicating the modifications to mobile device functionality that will be imposed upon entry to the physical location and/or event, and providing an opt-in/opt-out user interface element through which the user of the mobile device may indicate their agreement or non-agreement with the conditions of entry and the modification of their mobile device's original functionality.

Assuming that consent has been given, and a trigger condition has occurred, the container manager distributes the appropriate container(s) to the mobile device(s) that triggered the condition. For example, each of the mobile devices entering a protected physical area may be distributed the container(s) in response to them triggering the condition of "entry into the protected physical area" which can be determined based on a short range sensor technology, such as BLUETOOTH® which is a registered trademark of Bluetooth SIG, WI-FI® which is a registered trademark of the Wi-Fi Alliance®, Radio Frequency Identification (RFID) sensor, or a location service, such as Global Positioning System (GPS, cellular triangulation, or the like, with which the container manager communicates via one or more data connections, data networks, or the like. For example, transceivers at the entry ways of the protected physical area may transmit interrogation signals using any known or later developed communication protocols, handshake protocols, or the like. Mobile devices that receive such signals will respond with device identifier information and this information may be provided to the container manager, which may be executing locally on a server computing device at the protected physical location or may be executing remotely with communication being facilitated via one or more wired/wireless data networks.

A container agent may be previously installed on the mobile device, such as part of the operating system of the mobile device, implemented using hooks in the mobile device operating system, or as a separate application executing on the mobile device, for example. The container agent provides logic and functionality that communicates between the operating system and software executing on the mobile device and the container manager. The container agent may also provide logic and functionality for initiating, monitoring, and managing the execution of containers on the mobile device. For example, the interrogation signals transmitted to the mobile device may include information identifying the interrogation as being from the container manager or otherwise associated with container distribution. The container agent determines that a container distribution interrogation signal has been received and responds accordingly by informing the container manager, via the transceiver, that the user of the mobile device has consented to container distribution and execution and that distribution of containers to the mobile device is authorized.

The container agent may also periodically send its own interrogation signals for heartbeat responses from the transceivers to determine if the mobile device is still within the protected physical area, where if a heartbeat response is not received back from the container manager via the transceiver, it may be determined that the mobile device has moved outside the protected physical area. Alternatively, the mobile device may use location services, or location determining mechanisms to determine whether the mobile device is still within the protected physical area. Moreover, in some implementations, the container manager may detect via short range communication, location services, etc., that the mobile device has exited the protected physical area. In response to the mobile device leaving the protected physical area, as well as other criteria in some implementations, e.g., the event schedule indicating that the event has ended, the container agent executing on the mobile device may discontinue execution of containers associated with the event and/or protected physical area, and may remove them from the mobile device or otherwise place them in a dormant state.

The containers distributed to the mobile devices are executed by the mobile devices, where such execution may be initiated, monitored, and managed by the container agent. The containers may be automatically executed by the container agent upon receipt, assuming that the container manager has already evaluated the trigger conditions and determined that the appropriate conditions exist to warrant distribution and execution of the container. Alternatively, the trigger conditions for distribution of the container to the mobile device may be a separate trigger from trigger conditions for actually executing the container on the mobile device. In this latter case, the distribution of the containers may include with the container, certain trigger conditions or control parameters to be used by the container agent to determine when to initiate execution of the container and when to discontinue execution of the container and remove the container from the mobile device. For example, the container manager may have a trigger condition that upon entry into the protected physical area, and in response to consent being indicated as having been given, the container manager distributes the container to the mobile device along with a set of one or more trigger conditions for execution of the container on the mobile device by the container agent, such as in response to a particular time of day or scheduled event time range.

Regardless of whether the triggers are for distribution, execution, or discontinuing execution and removal of the container from the mobile device, the trigger conditions themselves may take many different forms depending on the desired implementation. For example, the trigger conditions may include certain times of day, a schedule time range for an event, entry into/exiting from geofenced areas, presence or lack thereof of other mobile devices associated with known users (e.g., presence of "friends" in a contacts list), an action taken or functionality of the mobile device which is initiated or an attempted initiation of such functionality (e.g., turning on the camera or initiating audio recording), a user request via the container agent to initiate execution of the container, initiating execution of a particular application or "app" on the mobile device, or the like.

The containers may execute instructions or applications, using the self-contained nature of the container to isolate the instruction or application execution for differences in the runtime environment of the particular mobile device, to control different existing functionality (also referred to as "original" functionality) of the mobile devices, different applications or "apps" on the mobile device, or the like. For example, the containers may comprise logic that disables certain pre-existing functionality of the mobile device, e.g., the camera on the mobile device, the audio recording capability of the mobile device, certain applications such as social networking applications, Internet browsers, etc. The containers may disable certain functionalities of the mobile device while allowing other functionality of the mobile device, e.g., allowing mobile phone calls but disabling the camera and audio recording functionality. The granularity to which such enablement/disablement of functionalities is made possible is implementation specific and will differ depending on the desired result, e.g., in some embodiments, the granularity of functionality control may be more coarse grain such as disabling all use of the camera on the mobile device, whereas in other embodiments, the functionality control may be more fine grained such as disabling the audio output of the mobile device except for phone calls from parties in a specific "favorites" list stored in the mobile device and which is specific to that mobile device and/or user of the mobile device.

The containers themselves may also provide a wide variety of different additional functionality to the mobile device. For example, a particular venue, or provider of the event at the particular venue, may wish to offer particular apps unique to the event, such as an interactive app that is enabled for the event but disabled thereafter. The containers may provide the interactive app that is executed on the mobile device and with which the user is able to interact during the event, but which is then disabled and removed from the mobile device upon termination of the event and/or exiting of the venue. For example, an event may utilize an app to provide an augmented reality experience to users of mobile devices that are attending the event in the protected physical premises. In one example, a museum may use the container mechanisms of the illustrative embodiments to distribute a guided tour app to users of mobile devices entering the museum and/or purchasing a ticket to view the exhibits. The guided tour app may be enabled through the container mechanism of the illustrative embodiments while the mobile device is present within the protected physical premises of the museum and/or for a predetermined period of time after distribution of the container and initiation of the execution of the container on the mobile device.

A plethora of different types of additional functionality may be distributed to mobile devices using the container mechanisms of the illustrative embodiments without departing from the spirit and scope of the illustrative embodiments. However, with each of these additional functionalities, and with the disabling/enabling of existing functionalities, apps, and the like of the mobile device, the additional functionality and/or disabling/enabling is transient in nature. That is, because the illustrative embodiments implement a container based mechanism, the conditions under which the applications and functionalities provided by the container, and/or the conditions under which the limitations of pre-existing functionalities of the mobile device are enforced by the containers, are temporally and/or spatially limited. When the conditions for execution of the container are no longer present, the container execution is disabled, and the container is removed from the mobile device.

It should be appreciated that in some embodiments, the additional functionality provided by containers may be provided on a microtransaction basis. That is, because of the transient nature of the container based mechanisms of the illustrative embodiments, controlling access to the functionality of the containers is improved such that access may be dependent upon microtransactions, such as "renting" the additional functionality on a limited basis. For example, a user may desire to utilize the additional functionality of the augmented reality for the event and may elect to pay for such additional functionality on a microtransaction basis. That is, the cost of the additional functionality is minimized because the access to the additional functionality via the container mechanisms of the illustrative embodiments is limited to the one event, to a specific time period of the event, and/or to the specific physical location of the event. Once the event has ended, the time period has expired, or the mobile device has left the physical location, the additional functionality of the container is disabled, and the container is removed from the mobile device.

While the container(s) are executing on the mobile device(s), the container agent(s) on the mobile device(s) collect information about the use of the mobile device during the time that the mobile device is present within the protected physical premises. The container agent communicates the collected information to the container manager. For example, the container agent may collect and send information to the container manager regarding whether or not, and how many, photographs are taken by the camera on the mobile device, whether or not the microphone or other audio recording hardware/software was used, particular applications or apps executed on the mobile device, social networks accessed, etc. The collected information may be provided as event log entries and the amount of detailed information provided in the event log entries may be implementation specific, e.g., the event log entries may merely indicate the occurrence of the particular action on the mobile device, may include selected metadata corresponding to the action taken, or in some cases may include copies of the data associated with the particular action, such as the data representing the actual photos taken or the actual audio recording made. In some cases, the collected information may be more statistical in nature, e.g., merely defining how many photos are taken, and not containing other metadata or the actual data of the photos.

The information collected by the container agent and communicated to the container manager may be utilized by the container manager to perform a machine learning training of the container manager trigger conditions and rules for distributing containers to mobile devices. That is, the trigger conditions employed by the container manager for determining when to distribute containers to mobile devices, and which containers to distribute to the mobile devices, may be defined in terms of rules that are applied to data received from mobile devices indicating their entry, presence within, and/or exiting of protected physical areas. The information collected may indicate, over time, which factors are most influential for particular contexts, i.e. particular protected physical areas, particular types of events, etc.

For example, each physical location and/or event may have an associated classification, e.g., concert venue, religious location (e.g., church, temple, mosque, etc.), museum, theatre, etc. By monitoring the operation of mobile devices while within a physical proximity of the physical location, it can be determined which mobile device operations are most often, least often, etc., used at these locations. In this way, the mobile device operations that are most influential at these events and locations may be determined through analysis of the logged operations. This information may be presented to entities associated with events and/or the physical locations for feedback as to which operations that are most influential that the entities wish to control through restrictions/enablement. This information may then be used to learn which mobile device operations are to be restricted and which operations are to be enabled for different classifications of events/locations.

It should be appreciated that the mechanisms of the illustrative embodiments are able to operate in conjunction with other mobile operating system management features, such as Apple's managed certificates, for example. That is, the containers of the illustrative embodiments may be utilized to install/uninstall operating system certificates automatically based on various triggering conditions as described previously, in a dynamic and transient manner. As a result, the user of the mobile device does not have to worry about restrictive certificates remaining on their mobile device as they will be removed once the criteria for removal of the container is met.

While the above description, and the description hereafter, focus mainly on the distribution and execution of containers to control functionality, or provide additional functionality, while a mobile device is within a protected physical area, the mechanisms of the illustrative embodiments are not limited to such. Rather, in some illustrative embodiments, the distribution and execution of containers may be specifically in response to the mobile device being outside of a physical area. For example, parents may wish to enforce certain restrictions on functionalities of mobile devices they provide to their children when the children are outside their homes. As another example, particular providers of events may wish to push apps or content to users' mobile devices after an event or upon users leaving the physical area where the event occurred, e.g., advertisements, offers for discounted products/applications, etc.

In some illustrative embodiments, trigger conditions indicating that the mobile device is exiting the protected physical area, or is outside the protected physical area, may be used as trigger conditions for distributing and executing containers on a mobile device. Using the parent example mentioned above, the parent may have already put into place protections within their home to keep their children from accessing inappropriate content via their mobile devices or using their mobile devices more than a particular amount of time, while the children are present within the protected physical area of the home. However, the parent may not have been able to enforce such restrictions outside the home without being overly restrictive. That is, while the parent may disable functionality on the mobile device, such disablement may be overreaching in that it is disabled under all conditions.

The mechanisms of the illustrative embodiments allow the parent to establish rules with the container manager, and establish particular containers, that are distributed to the mobile device and/or enabled in response to the child attempting to perform an action on their mobile device while outside the protected physical area of the home. For example, in response to the child's mobile device leaving the protected physical area, a container is distributed to the child's mobile device and executed such that it monitors for use of a Web browser, particular applications, etc., while the child is out of the protected physical area and disables that functionality if the child attempts to use it. In some cases, functionality of the mobile device may be disabled in response to a combination of trigger conditions, such as the mobile device being outside the home and the mobile device location changing more than a particular amount per unit of time, i.e. the mobile device traveling at a threshold speed or greater indicating that the child is possibly operating a vehicle, e.g., the ability to text and/or make phone calls while moving at that speed may be disabled. Thus, not only can controls be implemented using containers when the mobile device is within the protected physical area, but also outside the protected physical area depending on the desired implementation.

Thus, the mechanisms of the illustrative embodiments provide a dynamic and transient control over the functionality of mobile devices, as well as providing additional functions to mobile devices in a dynamic and transient manner, using a container based system. The mechanisms allow for containers to be distributed in response to triggers associated with rules being satisfied, allow for containers to be executed on mobile devices in response to enablement triggers being satisfied. The mechanisms further allow for specific targeted functionality specific to the particular protected physical area and/or event to be implemented using the container based system. Moreover, the containers provide the ability to enable/disable existing functionality of mobile devices in a manner customized to the particular providers of the protected physical area and/or event, as well as provide additional functionality otherwise not present on the mobile device.

It should be appreciated that throughout this description the term "mechanism" is used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the present description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed above, the mechanisms of the illustrative embodiments include a container manager implemented on a first computing device or computing system which may be locally present and/or remotely located relative to the physical area associated with the containers and container distribution/enablement rules implemented by the container manager. Moreover, the mechanisms of the illustrative embodiments include a container agent deployed to a mobile device which communicates with and operates in conjunction with the container manager. These components of the illustrative embodiments may communicate data with one another via one or more data connections or data networks which may be implemented as wired and/or wireless data connections. Moreover, sensors, transceivers, and the like may be provided in association with the physical area so as to facilitate the detection of the presence of the mobile device at the physical area and to facilitate the communication of data between the container agent and the container manager. Furthermore, the containers themselves are self-contained packages of application code and all the other elements necessary to execute the application independent of the runtime environment, as noted above. Thus, it is clear that the present invention is specifically directed to a technological computer environment and is directed to an improvement in the functioning of mobile devices with regard to controls over mobile device functions based on proximity to a protected physical area.

In view of this, it is clear that the illustrative embodiments may be utilized in many different types of data processing environments not all of which can be described in detail herein. However, in order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

Figure 2:
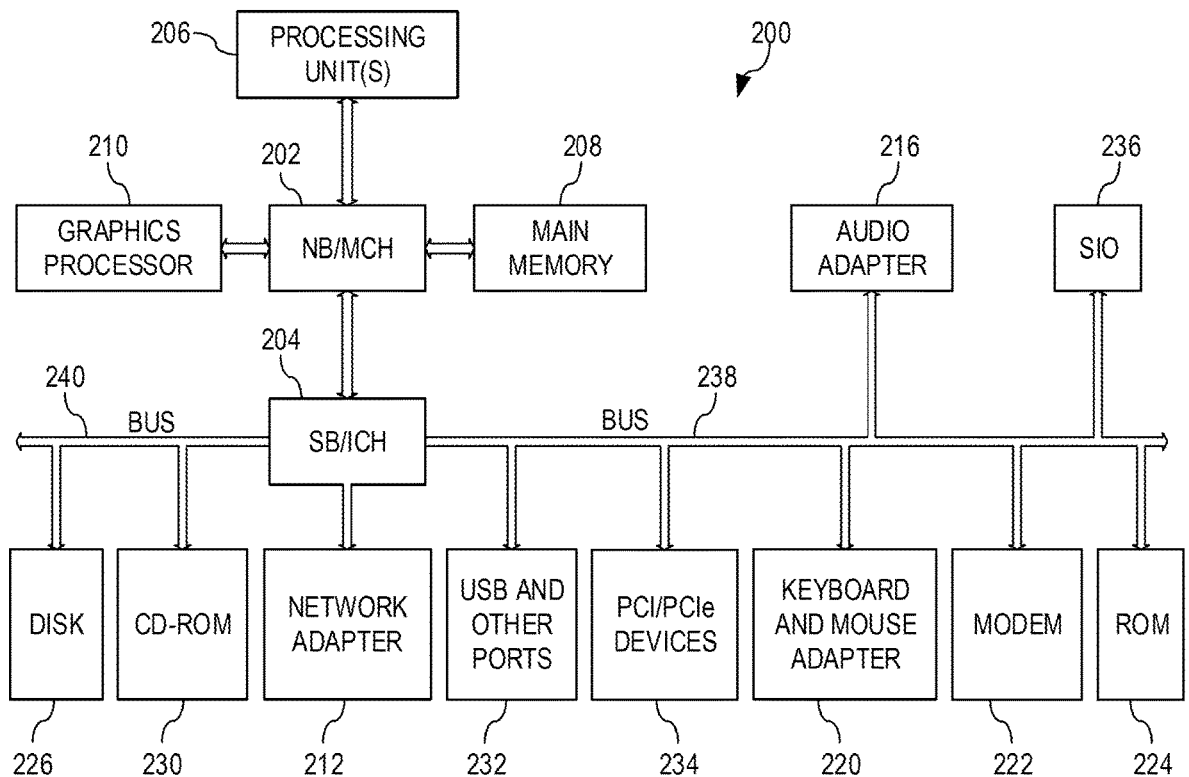
FIG. 2 is an example block diagram of a computing device in which aspects of the illustrative embodiments may be implemented.

FIG. 1A depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1A is intended as an example, not as an architectural limitation for different embodiments of the present invention, and therefore, the particular elements shown in FIG. 1A should not be considered limiting with regard to the environments in which the illustrative embodiments of the present invention may be implemented.

As shown in FIG. 1A, one or more of the computing devices, e.g., server 104, may be specifically configured to implement a container transient mobile device functional control (CTMDFC) system 120. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described herein, the implementation of the mechanisms of the illustrative embodiments improves the functionality of the computing device and provides a useful and concrete result that facilitates dynamic and transient distribution and enablement of container based applications to mobile devices to control the functionality of the mobile devices while the mobile devices are either within a protected physical area or are outside of the protected physical area.

As shown in FIG. 1A, the container transient mobile device functional control (CTMDFC) system 120 comprises a container manager 122, a mobile device registry 124, a container distribution/enablement rules engine 126, a container registry 128, and a container agent interface 129. It should be appreciated that while these are the primary operational elements of the CTMDFC system 120 depicted for purposes of describing the improved computer functionality made possible by illustrative embodiments of the present invention, the CTMDFC system 120 and/or computing device 104 may comprise other logic and elements generally known in the art for performing underlying computer operations, such as message passing logic, operating system functionality, libraries, data storage logic, application programming interfaces (APIs), or the like. These additional elements and/or logic provide underlying functionality and resources for facilitating the functions of the depicted elements. The same is true of the other primary component of the illustrative embodiments, i.e. the container agent 130, which may also comprise other logic and elements beyond those depicted in FIG. 1A which may be used to facilitate the functioning of the elements shown.

The container manager 122 provides the logic and computing resources for registering, distributing, monitoring, and managing containers. The container manager 122 provides the primary functionality of the CTMDFC system 120 as previously described above and orchestrates operations of the other elements 124-129 to support the functionality of the container manager 122. For example, the CTMDFC system 120, in response to the detection of a mobile device 114 being present within a protected physical area 160, retrieves the appropriate rules specifying the trigger conditions for distribution and execution of containers on the mobile device 114, applies those rules to the current conditions associated with the detection of the mobile device 114, and determines whether and which containers to distribute to the mobile device 114. Moreover, the container manager 122 may determine what other triggering conditions are to be implemented by the container agent 130 on the mobile device 114 with regard to executing the container(s) on the mobile device 114 and may include such triggering conditions in the transmissions for distributing the container(s). Moreover, the container manager 122 provides other functionality for monitoring the execution of the container(s) remotely based on information communicated back to the container manager 122 by the container agent 130, such as previously described above.

The mobile device registry 124 maintains a registry listing of information about mobile devices that enter, stay, and leave a previously defined protected physical area. There may be a separate device registry 124 for each of the predefined protected physical areas such that each registry 124 stores information about the mobile devices that enter, stay, and leave the protected physical area. This information is used not only to push containers, notifications, and other communications to these mobile devices, but also for later evaluation, such as determining what mobile devices (and associated users) were present at an event conducted at the protected physical premises, when such mobile devices were present, how long they stayed, when the mobile devices left the protected physical premises, what containers were distributed to those mobile devices, what actions were taken by the users of those mobile devices while present in the protected physical area or outside the protected physical area (depending on the particular implementation as previously described above), and the like.

When a mobile device, such as mobile device 114 in FIG. 1, is within a given proximity of the protected physical area 160, for example, the mobile device may be interrogated using a short range communication system and protocol, such as a BLUETOOTH® or WI-FI® based interrogation, in which the presence of the mobile device is detected. Alternatively, the container agent 130 may comprise logic for periodically polling a local vicinity of the mobile device 114 using a short range communication protocol to determine if there are any sensors or transceivers nearby associated with a container manager 120. The identity of the mobile device may be sent to the CTMDFC system 120 for registration in the mobile device registry, along with other data about the detection of the mobile device, e.g., timestamp information, identity of the particular sensors or transceivers that detected the mobile device, etc. Moreover, the mobile device 114, in responding to the interrogation, may send information indicating whether or not the user of the mobile device has consented to the distribution and execution of containers on the mobile device 114 as previously described above.

The sensors or transceivers that receive the interrogation response from the mobile device 114 and container agent 130 executing on the mobile device, or a local computing device that is local to the protected physical area 160, e.g., server 106, may be associated with an already registered protected physical area in the CTMDFC system 120 such that the identity of the source of data indicating the presence of the mobile device 114 may be correlated with the protected physical area 160 and data structures, such as rules data structures and trigger conditions, corresponding to the protected physical area 160. That is, the sensors or transceivers, in response to receiving a communication from the mobile device 114, may themselves forward the received information to the CTMDFC system 120 or may provide the data to the local computing device such as server 106 which then communicates this data to the CTMDFC system 120. In either case, the identity of the sending device is included in the communication such that it may be used by the CTMDFC system 120 to perform a lookup or otherwise correlate the data with a particular protected physical area 160.

The CTMDFC system 120 may perform its operations with regard to a plurality of different protected physical areas and thus, may maintain a registry (not shown) of these protected physical areas. This registry may include information regarding the identities of computing devices, sensors, transceivers, or the like that are associated with the protected physical areas. Each protected physical area may have a unique identifier associated with it which may be used to retrieve a set of container distribution/enablement rules data structures to apply to the data received from the devices at the protected physical area to determine when to distribute containers and enable containers on mobile devices whose presence is detected entering, staying within, or leaving the protected physical area.

The container distribution/enablement rules engine 126 provides the logic for retrieving sets of rules associated with a protected physical area 160 in which a mobile device 114 is detected as entering, present, or leaving. A provider of a protected physical area 160, when registering with the CTMDFC system 120, may establish a set of rules specifying trigger conditions for the distribution and/or enablement of containers in response to mobile devices being detected in proximity to the protected physical area 160. These rules may be associated with or linked to particular containers in the container registry 128 which may also be provided by the provider of the protected physical area 160 when registering, or defined thereafter using a user interface or the like provided by the container manager 122 of the CTMDFC system 120. Container creation is generally known in the art and thus, a more detailed explanation of how the containers in the container registry 128 are created is not provided herein. Any known or later developed mechanism for generating containers is intended to be within the spirit and scope of the present invention.

Thus, in response to receiving a notification from the computing devices and/or sensors/transceivers at the protected physical area 160 that the mobile device 114 was detected entering the protected physical area 160, and the mobile device 114 has transmitted the user's consent to receiving and executing containers, the container manager 122 invokes the container distribution/enablement rules engine 126 to retrieve the rules associated with the protected physical area 160 from a rules database (not shown) of the container distribution/enablement rules engine 126. The retrieved rules contain trigger conditions, such as previously described above, that determine which containers in the container registry 128 should be distributed and enabled on the mobile device 114. For example, the rules may be associated with different events occurring at the protected physical area 160 and thus, may have trigger conditions corresponding to the date and time of day of the event. Moreover, the trigger conditions may comprise trigger conditions such as an action being taken by a user of the mobile device 114, particular entrance into the physical location that is specifically used by the user of the mobile device 114, particular capabilities of the mobile device 114, such as whether or not the mobile device has a camera, whether or not the mobile device has text messaging capability, etc. (which may be determined from an identifier of the mobile device 114 which can be correlated to a device model or type and device capability information for that device model or type), a frequency of use of a particular action, operation, or capability of the mobile device while within the physical location, or the like. In some illustrative embodiments, the mobile device may comprise sensors, such as the camera, microphone, or other sensors, that detect external factors that may be utilized as triggering conditions, such as lighting changes in the physical location, decibel level changes of audio in the physical location, temperature changes in the physical location, or the like. The rules may be applied to the data received in the notification as well as other mobile device and/or environmental condition information for the protected physical area (date, time of day, weather conditions, etc.).

In response to the application of the container distribution/enablement rules by the engine 126 to the data and other mobile device and/or environmental condition information, if the trigger conditions of a rule are satisfied, a corresponding container from the container registry 128 is distributed to the mobile device 114 which triggered the original notification from the server 106 and/or sensors/transceivers as the protected physical area 160. As described previously, these containers may provide a variety of different functionalities which may include functionality for enabling/disabling existing functions of the mobile device 114 and/or providing new functionality that did not previously exist on the mobile device 114 prior to the distribution of the container. The distribution of the container may further include distribution of one or more rules associated with the protected physical area and/or event that provide the trigger conditions for enabling or executing the container on the mobile device 114. These rules that are distributed with the container may be implemented by the container agent 130 of the mobile device 114. The distribution of the container to the mobile device 114 may be facilitated via the container agent interface 129 which provides the logic for communicating data to/from the container agent 130 via the container manager interface 139 of the container agent 130.

The container agent 130, implemented on the mobile device 114, comprises logic for responding to interrogation signals from, and/or sending polling signals to, sensors/transceivers within a short range area of the mobile device 114 using short range communication protocols, such as BLUETOOTH®, WI-FI®, or the like. The container agent 130 further comprises logic for receiving containers distributed to the mobile device 114 and storing these received containers 134. The container agent 130 further comprises logic, via the container enable/disable/removal engine 138, to enable/disable/remove received containers 134. The container agent 130 includes a container manager interface 139 which provides the logic for communicating with the container manager 122 of the CTMDFC system 120 via the container agent interface 129. Moreover, the container agent 130 comprises logic, via the mobile device monitor 136, for monitoring the operation of the containers and/or the mobile device 114 while containers are executing on the mobile device 114, and for reporting the metrics and other logged information generated through this monitoring to the container manager 122 via the container manager interface 139.

The container enable/disable/removal engine 138 may operate to execute any enablement rules distributed with the containers to determine if the trigger conditions of these enablement rules have been satisfied such that the corresponding container is executed on the mobile device 114. Alternatively, in some illustrative embodiments, the received containers 134 may be automatically executed upon receipt by the container agent 130 and mobile device 114, or may be automatically executed if no enablement rules are distributed with the container. While the containers are executing, the mobile device monitor 136 monitors the execution of the containers and logs execution and state information about the container and the mobile device 114 for reporting back to the container manager 122. In this way, information about the container execution and mobile device 114 usage while in proximity to the protected physical area 160 may be used as a basis for further learning by the container manager 122 and/or CTMDFC system 120 of the distribution and enablement rule trigger conditions that should be employed with a particular protected physical area 160 and/or event.

Figure 1B:
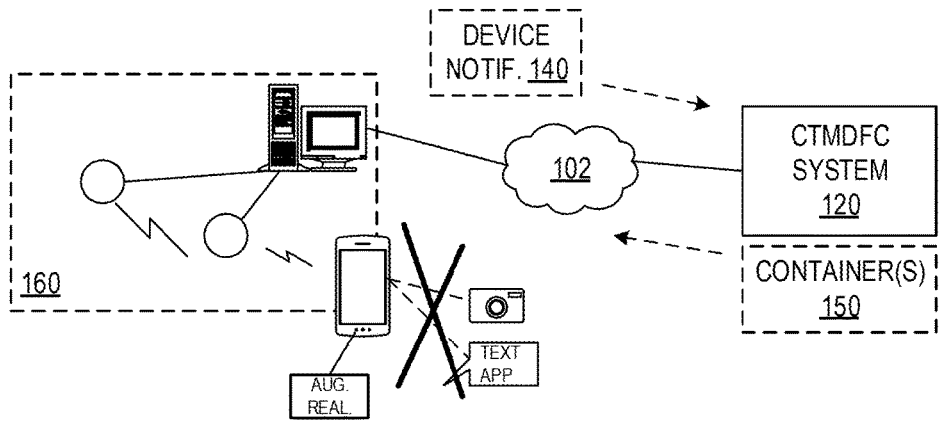
FIG. 1B is an example diagram of a scenario for controlling mobile device functionality in accordance with one illustrative embodiment.

It should be appreciated that while FIGS. 1A and 1B show the CTMDFC system 120 as being separate and remotely located from the protected physical area 160, the illustrative embodiments are not limited to such. Rather, the server 104 and the CTMDFC system 120 implemented on the server 104 may be local to the protected physical area 160 and/or its functionality combined with that of server 106. Thus, in such an embodiment, the operations performed by the CTMDFC system 120 may be performed locally at the protected physical area 160 without the need to transmit data via the network 102.

To illustrate the capabilities of one example illustrative embodiment, consider the following anecdotal example in conjunction with the depiction in FIG. 1B and with continued reference to the elements shown in FIG. 1A. Assume that a user of a mobile device 114 is attending an entertainment event, e.g., a concert, movie, etc., occurring at a protected physical area 160, such as a theater. The user performs an online electronic transaction to obtain an electronic ticket for entry to the event at the particular protected physical location 160. As a requirement of the purchase of the electronic ticket, a legal contract is established between the user and the provider of the event in which the user consents to the installation of the container agent 130 on the user's mobile device 114 and the distribution and execution of containers on the user's mobile device 114 during the event.

For example, the user may be presented with a user interface, either on the mobile device or via another computing device, through which the user is presented with an opt-in/opt-out user interface element allowing the user to specify consent/non-consent to the conditions of entry into the protected physical area 160 which includes the distribution to the mobile device, and execution of one or more containers to control operations of the mobile device, i.e. modify the original functionality of the mobile device and/or provide new functionality to the mobile device. The opting-out by the user may be recorded along with information indicating a need to take alternative measures to secure the functionality of the mobile device. In some cases, this opting-in/opting-out may be performed on the mobile device via a user interface specifically in response to the user and mobile device being within a predetermined proximity of the protected physical area 160. In such a case, if the user opts-out, a notification may be sent to local devices at the protected physical area 160 informing them that the user has opted-out, e.g., computing devices associated with a ticket taking agent, a point of sale terminal, the container manager, and the like. In this way, alternative options for controlling operation of the mobile device may be employed, e.g., depositing the mobile device in a locker or security container, or the like. Electronic records may be maintained demonstrating the user's consent/non-consent through the selection of graphical user interface elements, providing a digital signature, making a payment, or any other known or later developed manner of recording electronically the user's consent/non-consent to terms and conditions of providing the electronic ticket to the user. In some cases, consent is a requirement of providing the electronic ticket and thus, the electronic ticket may not be provided to the user unless they provide consent to container distribution and execution on their mobile device.

Assume also that a provider of the protected physical area 160, or a provider of the event at the protected physical area 160, has established container distribution and enablement rules as well as defined containers for the particular event and/or protected physical area 160. In this example, the event is a theatrical stage performance and the event provider does not wish recordings of the performance to be able to be made and does not wish texting to be able to be performed other than during intermission. Thus, the event and/or protected physical area 160 provider defines a distribution rule for a container that indicates trigger conditions of a date and time range for when performances are occurring at the protected physical area 160, and trigger conditions that the mobile devices have a camera or audio recording capability. Moreover, in order to improve the experience for their audience, the event provider has created an augmented reality application that they wish to distribute to the mobile devices of audience members so that they may, if they wish, use the augmented reality application to enhance the performance.

A first container may be generated that comprises the code, and necessary container elements for executing this code on mobile devices independently of the runtime environment, to control the functionality of the camera and audio recording capabilities of audience member mobile devices. A second container may be generated that enables/disables texting on the mobile device 114 during the time period of the performance outside of intermission, i.e. the texting may be enabled during intermission but is disabled at all other times of the performance. A third container may be generated that provides the augmented reality application and enables its use only during the performance. These containers are shown in FIG. 1B as containers 150, which are pre-registered with the CTMDFC system 120 in the container registry 128 and the corresponding container distribution/enablement rules are established with the engine 126.

At or around the scheduled time of the event, and at the physical location 160 where the event is occurring, the user may arrive with their mobile device 114 on their person. The physical location 160 may have an established geofence with sensors/transceivers 162, 164 provided to mark the borders of the protected physical location 160, or the protected physical location 160 may be associated with global positioning system (GPS) coordinates which may be used to determine whether or not the mobile device 114 is within a predetermined region of space corresponding to the protected physical area 160. Either via GPS positioning, cellular triangulation, via an interrogation or polling based communication with the sensors/transceivers 162, 164 at the protected physical area 160, or any other location determination methodology, a relative position of the mobile device 114 to the protected physical area 160 is determined such that it can be determined whether the mobile device 114 is entering, staying within, or leaving the protected physical area 160.

In response to detecting the presence of the mobile device 114 entering, within, or in some cases leaving the protected physical area 160, the local computing device 106 sends a mobile device detection notification 140 to the CTMDF system 120 via the network 102. The CTMDFC system 120 receives the notification 140 which provides information for identifying the protected physical environment 160 and the mobile device 114. The CTMDFC system 120 registers the mobile device in the mobile device registry 124 and retrieves the distribution/enablement rules corresponding to the identified protected physical area 160. The CTMDFC system 120 applies the distribution/enablement rules to the information received in the mobile device notification 140, environmental conditions information, mobile device information, and the like, to determine whether and which containers to distribute and/or enable with regard to the mobile device 114.

For example, in this example scenario, the mobile device notification 140 may provide an identifier of the mobile device 114 that is correlated by the CTMDFC system 120 with mobile device type information and mobile device capability information, e.g., whether or not the mobile device has a camera, has texting capability, etc. A distribution/enablement rule may specify trigger conditions of the mobile device having a camera and/or texting capability, and if one or more of these trigger criteria are met, then one or more corresponding containers, e.g., the first and second container mentioned previously, may be selected for distribution to the mobile device 114. The CTMDFC system 120 also may apply a rule that evaluates the date/time of the mobile device notification 140 relative to one or more dates/times of events association with the protected physical area 160. If the date/time of the mobile device notification 140 corresponds to a date/time of an event at the protected physical area 160, then corresponding containers 150 are retrieved and distributed to the mobile device 114, e.g., the third container mentioned previously.

The CTMDFC system 120 distributes the container(s) 150 to the mobile device 114 via the data network 102 and computing system 106, as well as wireless transceivers, e.g., 164 in FIG. 1B. The CTMDFC system 120 may also distribute with the container(s) 150 any applicable enablement rules associated with these container(s) 150 and/or the event/protected physical location 160.

The container agent 130 at the mobile device 114 may execute the received containers to implement the function controls and any new functionality provided in the applications of the containers. For example, in response to executing the first container on the mobile device 114, the camera and audio recording capabilities of the mobile device 114 may be disabled during the time period corresponding to the theatrical performance, as indicated by the bold "X" in FIG. 1B. Moreover, the texting capabilities of the mobile device 114 may be disabled during the theatrical performance other than during the intermission time frame. That is, the execution of the container on the mobile device 114 may continue to monitor the current time and compare that current time to the time ranges indicated in the application of the container and only disable the text capabilities of the mobile device 114 during an initial range of time corresponding to a first portion of the theatrical performance and a second portion of the theatrical performance, while enabling the text capabilities during a third portion of the theatrical performance corresponding to an intermission time frame.

In addition, the distributed third container may be executed on the mobile device 114 to implement a new functionality of the mobile device 114 with regard to generating an augmented reality overlay of the theatrical performance through a display on the mobile device 114. For example, the augmented reality overlay may add virtual scenery or graphical effects to a video output of the theatrical performance on the mobile device 114.

When the event concludes, and or the mobile device 114 leaves the protected physical area 160, the container agent 130 may disable the container executions associated with the event and/or protected physical are 160 and may remove the containers from the mobile device 114. In this way, the function controls and additional new functions provided by the containers 150 are transient and not permanent changes to the operation of the mobile device 114. Moreover, the distribution of the containers is dynamic based on the triggering conditions being met. Thus, a dynamic and transient container based functional control of mobile devices is made possible by the mechanisms of the illustrative embodiments.

In some illustrative embodiments, rather than the user of the mobile device 114 having to consent to the execution of the container agent and containers on the mobile device 114 prior to entry into the protected physical location 160, the consent may be provided in response to a notification output on the mobile device 114 responsive to the mobile device 114 being within a proximity of the protected physical location 160. For example, in some embodiments, the distribution of the container agent and/or containers may be performed automatically to the mobile device 114 in response to the mobile device coming within proximity of the protected physical location 160. The user of the mobile device 114 is then notified that the container agent and container has been installed on the mobile device 114 and requests consent of the user to execute these components on the mobile device 114. The user may then provide consent at which time the above described functionality of the container agent and containers may be implemented on the mobile device 114. The user may not provide consent, and responsive to the failure to provide consent, a corresponding notification may be sent to the computing system 106 which may take actions to prevent entry by the user into the protected physical area 160, or otherwise provide other controls over the use of the mobile device 114 while the user is withing the protected physical area 160, e.g., placing the mobile device 114 in a secure locker, protective pouch, or the like.

Still further, in some illustrative embodiments, consent of the user may not be required. For example, notices may be posted at the protected physical area 160 informing users that are physically present that software will be automatically installed on their mobile devices and that entry to the protected physical area 160 is itself considered consent by the user to such installation and execution of the software. As a result, the container agent and containers may be automatically distributed and executed on the mobile device 114 in response to the user entering the protected physical area 160.

Thus, the illustrative embodiments provide container based mechanisms that implement dynamic and transient control over the functionality of mobile devices, as well as providing additional functions to mobile devices in a dynamic and transient manner. As described above, this control over the functionality of the mobile devices may take many different forms including restrictive controls, function enablement controls, and adding new functionality to the mobile device that was not present in the existing functionality of the mobile device. For example, with regard to restrictive controls, the container mechanisms of the illustrative embodiments may be implemented to restrict incoming call ringing functions, restrict incoming call answering functions, restrict outgoing call functions, restrict photo/video capture functions of a camera of the mobile device, turn off a flash function of the camera of the mobile device, disable internet browser functionality of the mobile device, disable certain applications or types of applications on the mobile device such that they are not able to be executed on the mobile device, restrict volume of audio output of the mobile device, and the like. Similarly, the container may in some implementations, enable the same types of existing functions as discussed above with regard to the restrictive controls.

Moreover, with regard to enabling of existing functionality of the mobile device, various existing functions present in the mobile device may be enabled automatically by the container in response to its execution on the mobile device, and various particular parameters or configurations of these existing functions may be implemented by the executed container. For example, an existing internet browser capability may be enabled and a web page, specified by the container, may be automatically loaded by the internet browser, e.g., a web page associated with the protected physical location. Moreover, particular applications on the mobile device may be enabled, such as a social media application, a video playback application e.g., YouTube™ application, may be enabled and a corresponding video loaded and run, a music or audio recording playback application may be enabled and a corresponding music file loaded and played back, an email or texting application may be enabled and a corresponding email/text may be automatically generated, or any of a plurality of other possible applications and functionality of the mobile device may be enabled and automatically configured by the execution of the container on the mobile device. In some cases, the physical devices integrated into the mobile device itself may be enabled by the container, such as enabling the microphone of the mobile device, the camera of the mobile device, a vibration generator of the mobile device, or the like.

In addition, as noted above, the containers may themselves provide to the mobile device, or cause to be installed on the mobile device via a data network, additional new functionality that was not already present in the existing functionality of the mobile device. For example, the container may cause new applications to be installed on the mobile device that provide additional functionality for the mobile device. As examples, the new functionality may include virtual tours of the protected physical location, interactive maps, guidebooks, interactive audio tours, augmented reality applications, promotional applications such as video games, and the like. These additional functionalities may be automatically downloaded and installed on the mobile device based on the execution of the container, so as to provide an improved experience to the user of the mobile device while they are in proximity to the protected physical location and potentially thereafter. In some cases, the new functionality may augment existing functionality of the mobile device, such as in the case of augmented reality applications which augment the camera functionality, implementation of visual effects on camera images or audio effects on audio playback, new ringtones and audio notifications that the mobile device may utilize, and the like. Any new functionality that may be deployed on the mobile device may be implemented using the container based mechanisms of the illustrative embodiments without departing from the spirit and scope of the present invention.

As noted above, the mechanisms of the illustrative embodiments utilize specifically configured computing devices, or data processing systems, to perform the operations for implementing dynamic and transient container based control of mobile device functions with regard to protected physical areas. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 or 106 in FIG. 1A, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described herein with regard to one or more embodiments of the CTMDFC system 120, or components thereof, or container agent 130, in the case of the computing device being a mobile device.

Those of ordinary skill in the art will appreciate that the hardware in FIGS. 1A-1B and 2 may vary depending on the implementation. Other internal hardware or peripheral devices, such as flash memory, equivalent non-volatile memory, or optical disk drives and the like, may be used in addition to or in place of the hardware depicted in FIGS. 1A-1B and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
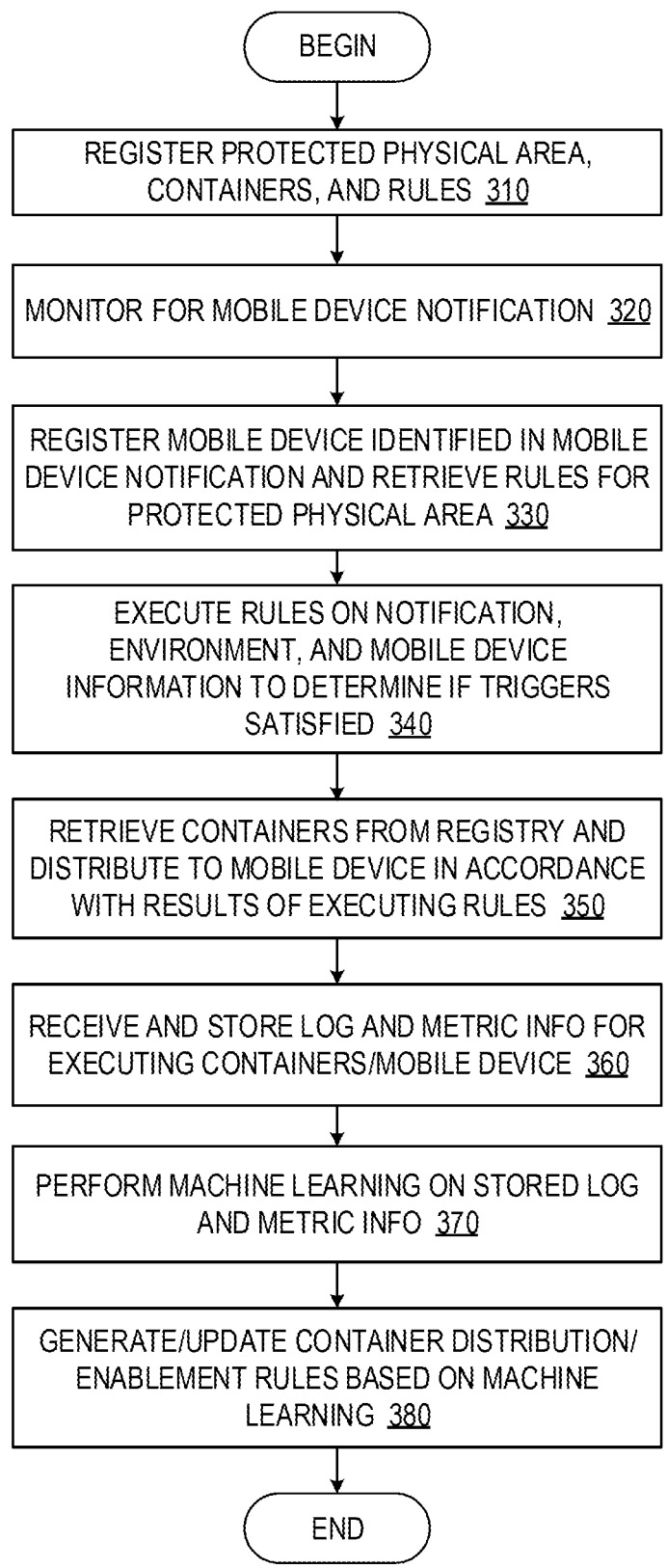
FIG. 3 is a flowchart outlining an example operation of a CTMDFC system in accordance with one illustrative embodiment.

FIG. 3 is a flowchart outlining an example operation of a CTMDFC system in accordance with one illustrative embodiment. The operation outlined in FIG. 3 may be implemented by a computing system specifically configured to implement the CTMDFC system and its components as shown in FIGS. 1A-1B, for example. The computing system may be local to a protected physical area or may be remotely located from the protected physical area and accessed via one or more data networks.

As shown in FIG. 3, the operation starts by registering a protected physical area, its corresponding containers, and container distribution/enablement rules (step 310). The CTMDFC system monitors for a mobile device notification indicating that the presence of a mobile device within a proximity of the protected physical area was detected (step 320). In response, the mobile device specified in the notification is registered with the CTMDFC system, and corresponding container distribution/enablement rules for the protected physical area are retrieved (step 330). The retrieved distribution/enablement rules are executed on the information specified in the mobile device notification, environmental information for the protected physical area, and/or mobile device information, to determine if trigger conditions of the rules are satisfied (step 340). Containers corresponding to rules whose trigger conditions are satisfied are retrieved from a container registry and distributed to the mobile device (step 350). The CTMDFC system receives and stores log information and metrics sent to the CTMDFC system from the mobile device while the containers are executing on the mobile device (step 360). The CTMDFC system performs a machine learning analysis of the received log and metric information to determine trigger conditions that should be applied to mobile devices in proximity to the protected physical area (step 370). Container distribution/enablement rules are then generated and/or updated based on the machine learning (step 380). The operation then terminates.

Figure 4:
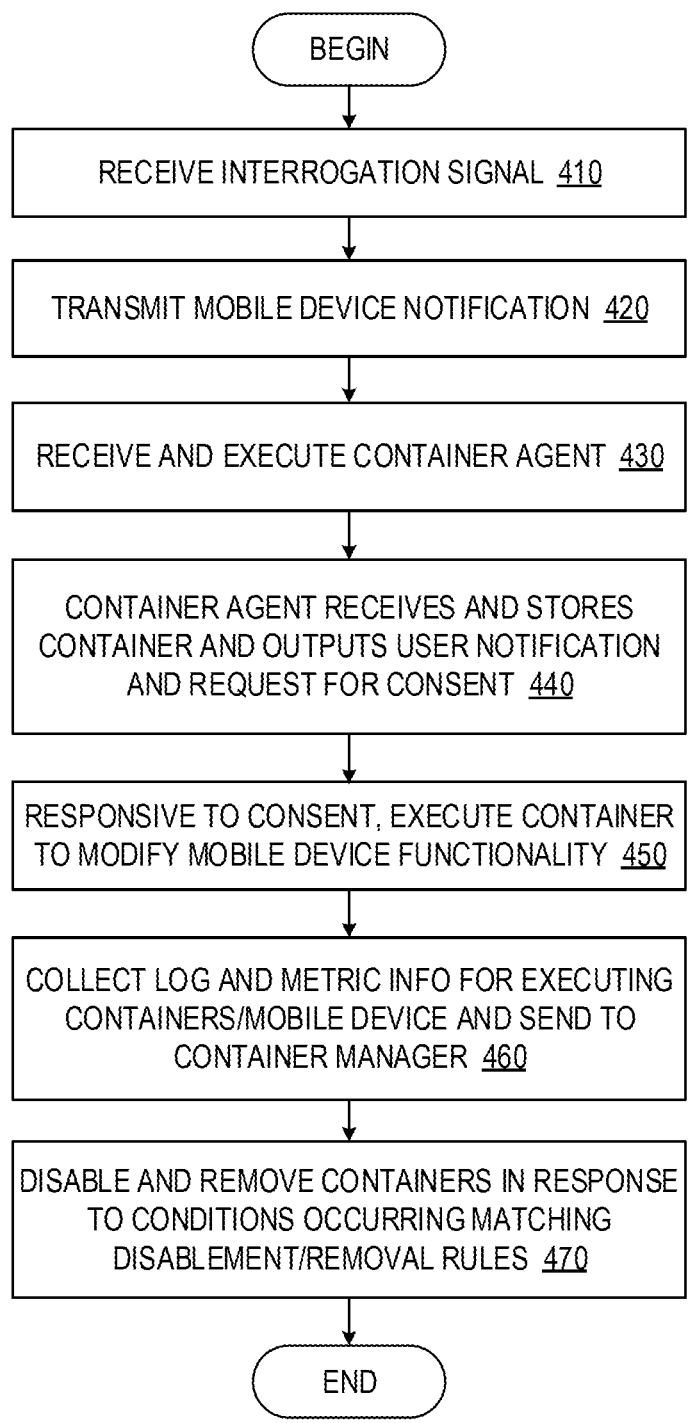
FIG. 4 is a flowchart outlining an example operation of a container agent in accordance with one illustrative embodiment.

FIG. 4 is a flowchart outlining an example operation of a container agent in accordance with one illustrative embodiment. The operation shown in FIG. 4 may be implemented by a mobile device, such as a smart mobile phone, a tablet computing device, laptop computer, wearable computing device, or the like. As shown in FIG. 4 the operation starts by receiving an interrogation signal from a transceiver associated with a protected physical area (step 410). Responsive to the interrogation signal, a mobile device notification is transmitted to the transceiver indicating the identity of the mobile device (step 420). The mobile device then receives a container agent and executes the container agent (step 430). The container agent receives a container, stores the received container, and provides a notification output to the user of the mobile device of the container and requesting consent of the user to execution of the container (step 440). In response to receiving consent from the user, the container is executed which causes the mobile device to modify its functionality in accordance with the logic of the application(s) in the container (step 450). This may include disabling/enabling existing functionality of the mobile device or adding new functionality to the mobile device that exists while the container is executing.

While the containers are executing on the mobile device, log and metrics information is collected by the container agent and reported to a remotely located container manager (step 460). The container agent further monitors the operation of the mobile device to determine if conditions are such that execution of the containers should be discontinued in which case the container executions are discontinued and the containers are removed from the mobile device (step 470). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, BLUETOOTH® wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of modifying an original functionality of a mobile device in response to the mobile device being within a predetermined proximity of a physical location, the method comprising:
    receiving, by a container agent executing on the mobile device, a container from a container manager server, in response to the mobile device being within the predetermined proximity of the physical location, wherein the container comprises processor executable instructions that implement a modification to the original functionality of the mobile device;
    monitoring, by the container agent, operation of the mobile device to determine if operation of the mobile device satisfies a triggering condition for execution of the container;
    in response to results of the monitoring indicating that the operation of the mobile device satisfies a triggering condition for execution of the container, executing, by the container agent, the container such that the original functionality of the mobile device is modified in accordance with the modification implemented by the container, while the mobile device is present within the predetermined proximity of the physical location; and
    in response to the mobile device no longer being within the predetermined proximity of the physical location, removing, by the container agent, the container from the mobile device and restoring the original functionality of the mobile device.

2. The method of claim 1, wherein the container is a self-contained executable package of software that includes all software resources needed to run an application present within the container and is not dependent on a runtime environment in which the container is executed.

3. The method of claim 1, wherein, in response to determining that results of monitoring the operation of the mobile device indicate that the triggering condition is satisfied, the container agent outputs, on the mobile device, a notification of the modification to the original functionality of the mobile device implemented by the container, wherein the notification comprises an opt-in/opt-out user interface element, and wherein in response to a user of the mobile device providing a user input to opt-in via the opt-in/opt-out user interface element, the container agent executes the container.

4. The method of claim 3, wherein in response to the user providing a user input to opt-out via the opt-in/opt-out user interface element, a notification is sent to one or more computing devices associated with personnel associated with the physical location or an event occurring at the physical location.

5. The method of claim 1, wherein monitoring the operation of the mobile device comprises:
   monitoring and logging at least one of monitoring photos taken by a camera of the mobile device, monitoring microphone usage of the mobile device, monitoring applications usage on the mobile device, or monitoring social networks accessed by the mobile device, and
   sending, to a container manager, a log of the at least one of photos taken by the camera of the mobile device, microphone usage of the mobile device, application usage on the mobile device, or social networks accessed by the mobile device.

6. The method of claim 1, wherein the selected functionality in the original functionality of the mobile device comprises at least one of a camera functionality of the mobile device, a microphone functionality of the mobile device, or a social network application execution on the mobile device.

7. The method of claim 1, wherein the new functionality comprises a new interactive application executed on the mobile device that is specific to the physical location or an event occurring at the physical location.

8. The method of claim 1, wherein receiving the container from the container manager server is performed in response to a location detection mechanism associated with the container manager server detecting a presence of the mobile device within the predetermined proximity, and wherein the location detection mechanism comprises at least one of a short range sensor located within the predetermined proximity of the physical location, a global positioning system, or a cellular triangulation system.

9. The method of claim 1, wherein the container agent is installed and executed on the mobile device in response to a user of the mobile device entering into a legal agreement with an entity associated with the physical location or an entity associated with an event occurring at the physical location.

10. The method of claim 9, wherein the modification to the original functionality of the mobile device comprises at least one of restricting a selected functionality in the original functionality of the mobile device, enabling of the selected functionality in the original functionality of the mobile device, or providing a new functionality, not present in the original functionality.

11. A computer program product comprising a computer readable storage medium having a computer readable program stored therein, wherein the computer readable program, when executed on one or more processors of a mobile device, causes the mobile device to implement a container agent that operates to modify an original functionality of the mobile device in response to the mobile device being within a predetermined proximity of a physical location, at least by:
   receiving, by the container agent, a container from a container manager server, in response to the mobile device being within the predetermined proximity of the physical location, wherein the container comprises processor executable instructions that implement a modification to the original functionality of the mobile device;
   monitoring, by the container agent, operation of the mobile device to determine if operation of the mobile device satisfies a triggering condition for execution of the container;
   in response to results of the monitoring indicating that the operation of the mobile device satisfies a triggering condition for execution of the container, executing, by the container agent, the container such that the original functionality of the mobile device is modified in accordance with the modification implemented by the container, while the mobile device is present within the predetermined proximity of the physical location; and
   in response to the mobile device no longer being within the predetermined proximity of the physical location, removing, by the container agent, the container from the mobile device and restoring the original functionality of the mobile device.

12. The computer program product of claim 11, wherein the container is a self-contained executable package of software that includes all software resources needed to run an application present within the container and is not dependent on a runtime environment in which the container is executed.

13. The computer program product of claim 11, wherein, in response to determining that results of monitoring the operation of the mobile device indicate that the triggering condition is satisfied, the container agent outputs, on the mobile device, a notification of the modification to the original functionality of the mobile device implemented by the container, wherein the notification comprises an opt-in/opt-out user interface element, and wherein in response to a user of the mobile device providing a user input to opt-in via the opt-in/opt-out user interface element, the container agent executes the container.

14. The computer program product of claim 13, wherein in response to the user providing a user input to opt-out via the opt-in/opt-out user interface element, a notification is sent to one or more computing devices associated with personnel associated with the physical location or an event occurring at the physical location.

15. The computer program product of claim 11, wherein monitoring the operation of the mobile device comprises:
   monitoring and logging at least one of monitoring photos taken by a camera of the mobile device, monitoring microphone usage of the mobile device, monitoring applications usage on the mobile device, or monitoring social networks accessed by the mobile device, and
   sending, to a container manager, a log of the at least one of photos taken by the camera of the mobile device, microphone usage of the mobile device, application usage on the mobile device, or social networks accessed by the mobile device.

16. The computer program product of claim 11, wherein the selected functionality in the original functionality of the mobile device comprises at least one of a camera functionality of the mobile device, a microphone functionality of the mobile device, or a social network application execution on the mobile device.

17. The computer program product of claim 11, wherein the new functionality comprises a new interactive application executed on the mobile device that is specific to the physical location or an event occurring at the physical location.

18. The computer program product of claim 11, wherein receiving the container from the container manager server is performed in response to a location detection mechanism associated with the container manager server detecting a presence of the mobile device within the predetermined proximity, and wherein the location detection mechanism comprises at least one of a short range sensor located within the predetermined proximity of the physical location, a global positioning system, or a cellular triangulation system.

19. The computer program product of claim 11, wherein the container agent is installed and executed on the mobile device in response to a user of the mobile device entering into a legal agreement with an entity associated with the physical location or an entity associated with an event occurring at the physical location.

20. A mobile device, comprising:
- a processor; and
- a memory coupled to the processor, wherein the memory comprises instructions which, when executed by the processor, cause the processor to implement a container agent that operates to modify an original functionality of the mobile device in response to the mobile device being within a predetermined proximity of a physical location, at least by:
- receiving, by the container agent, a container from a container manager server, in response to the mobile device being within the predetermined proximity of the physical location, wherein the container comprises processor executable instructions that implement a modification to the original functionality of the mobile device;
- monitoring, by the container agent, operation of the mobile device to determine if operation of the mobile device satisfies a triggering condition for execution of the container;
- in response to results of the monitoring indicating that the operation of the mobile device satisfies a triggering condition for execution of the container, executing, by the container agent, the container such that the original functionality of the mobile device is modified in accordance with the modification implemented by the container, while the mobile device is present within the predetermined proximity of the physical location; and
- in response to the mobile device no longer being within the predetermined proximity of the physical location, removing, by the container agent, the container from the mobile device and restoring the original functionality of the mobile device.

* * * * *